United States Patent
Verbowski

(10) Patent No.: US 8,556,512 B2
(45) Date of Patent: Oct. 15, 2013

(54) ELASTOMERIC COMPRESSION PRELOADED SUPPORT INSULATORS

(76) Inventor: Larry Verbowski, Bay City, MI (US)

( * ) Notice: Subject to any disclaimer, the term of this patent is extended or adjusted under 35 U.S.C. 154(b) by 265 days.

(21) Appl. No.: 12/925,787

(22) Filed: Oct. 29, 2010

(65) Prior Publication Data

US 2011/0103724 A1   May 5, 2011

Related U.S. Application Data

(60) Provisional application No. 61/280,316, filed on Nov. 2, 2009.

(51) Int. Cl.
*F16C 27/00* (2006.01)
*F16C 27/06* (2006.01)

(52) U.S. Cl.
USPC .................................. 384/215; 384/222

(58) Field of Classification Search
USPC ......... 384/192, 202, 220, 222, 215, 216, 217, 384/203, 230, 247
See application file for complete search history.

(56) References Cited

U.S. PATENT DOCUMENTS

| | | | | | |
|---|---|---|---|---|---|
| 2,906,572 | A | * | 9/1959 | Wroby | 384/536 |
| 3,298,754 | A | * | 1/1967 | Riester | 384/203 |
| 5,013,166 | A | * | 5/1991 | Domer | 384/220 |
| 5,061,087 | A | * | 10/1991 | Roerig et al. | 384/192 |
| 7,740,236 | B2 | * | 6/2010 | Martin | 267/141.5 |

* cited by examiner

*Primary Examiner* — Phillip A Johnson

(57) ABSTRACT

Elastomeric compression preloaded support insulators for automotive drive shafts.

6 Claims, 2 Drawing Sheets

ELASTOMERIC COMPRESSION PRELOADED SUPPORT INSULATORS

This application claims priority from U.S. Ser. No. 61/280,316 filed Nov. 2, 2009.

The invention disclosed and claimed herein deals with compression preloaded, channel located support insulator for automotive drive shafts.

BACKGROUND OF THE INVENTION

In the automobiles manufactured today, there is put in place, a laminated, vulcanized vibration dampening device that is attached around the automobile drive shaft at the forward end. The device not only provided for vibration dampening, but also is supposed to protect the bearings located on the drive shaft at this point from water, rust and dirt.

The device is manufactured such that it is separated from the drive shaft bearings by air, in that the covering encircles the drive shaft, and is attached to a large metal ring that also encircles the drive shaft. The area encompassed by this arrangement essentially is filled with air which means that the drive shaft can operate on the bearings and at the same time move in any upward and downward direction to provide some absorbency from shocks taken by the automobile.

The major problem with this device is that it was ill conceived and does not last for more than about a year on the automobile and thus, there is no longer any absorbency of shock as the rubber covering that is attached to the metal ring is glued in place. The glue fails, the water, dirt, and eventually rust enter and separate the rubber from the metal ring and the entire device is rendered useless.

Moreover, the problem is compounded because there is no method or device currently available for repairing the device while it is mounted on the automobile without complete disassembly of the drive shaft and associated mechanisms. Complete disassembly and replacement of the entire carrier support bearing is further complicated by upsetting the overall balance of the driveline and thereby causing severe vibration issues at driving speeds, dramatically reducing the lifespan of the related components.

The inventor herein has provided a new and novel device and a method to overcome these problems.

Thus, the device and method of this invention provide a unique ability to repair the drive shaft while it is still on the automobile thereby eliminating complete extensive disassembly of the system and thereby retaining the factory driveline balance of the drive shaft.

The novel feature of the device of this invention are a unique channel perimeter that locks inside the original rigid support system, a split ring design that allows for insertion without drive line disassembly, inside diameter sized for compression preload around existing bearings, elastomeric materials for shock absorbency as opposed to air, and the design solves suspension, driveline deficiencies, and the system can be customized for individual vehicle needs.

THE INVENTION

Thus, what is disclosed and claimed herein is an elastomeric compression preloaded support insulator for automotive drive shafts.

The insulator comprises a unitary structure comprised of concentric circular portions including an outer rim having an outside surface, having outside edges that project perpendicularly to the outside surface; a center portion essentially centered in an inside surface of the outer rim, said center portion having a lower front edge, and a hub, said hub projecting laterally from the lower front edge of the center portion, there being a large centered opening in the insulator.

DETAILED DESCRIPTION OF THE INVENTION

Figure 1:
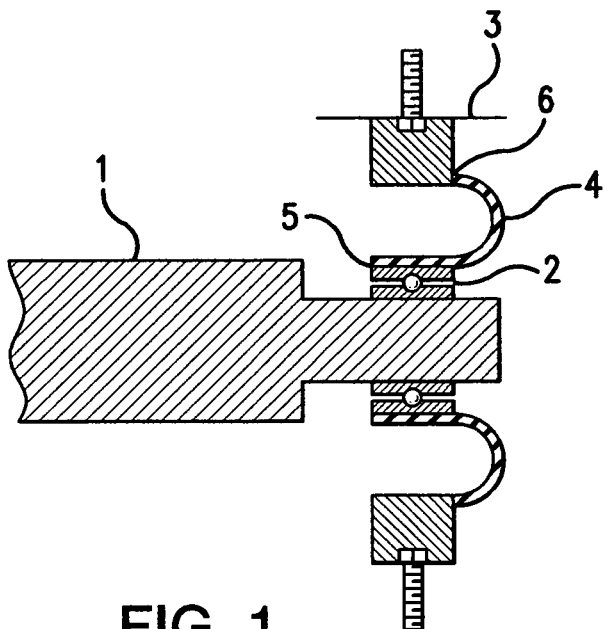
FIG. 1 is a full side view of a cross section of a prior art drive shaft support system for an automotive drive shaft.

Turning now to FIG. 1, there is shown a prior art drive shaft support system for an automotive drive shaft in which there is shown the drive shaft 1, the drive shaft bearing 2, the support brace 3, the bolt in the support brace 3, the rubber gasket 4 that is glued to the bearing at 5 and glued to the brace 3 at 6.

Figure 4:
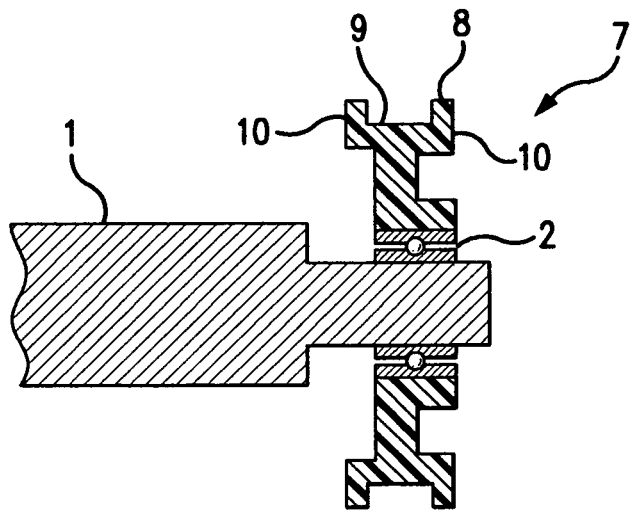
FIG. 4 is a full side view of a cross section of a drive shaft showing the device of the instant invention.

FIG. 4 shows a device of this invention wherein there is shown the drive shaft 1 which forms no part of the invention, the drive shaft bearing 2 which forms no part of the invention, and the device of this invention 7.

The devices 7 of this are manufactured from elastomeric materials to build in flexibility to help with shock absorbency of the device 7. Typically, in order to build in toughness so that the device 7 has durability, it is manufactured from polyurethanes, said polyurethanes being known in the art and especially known by those in automotive parts development and manufacture.

Figure 2:
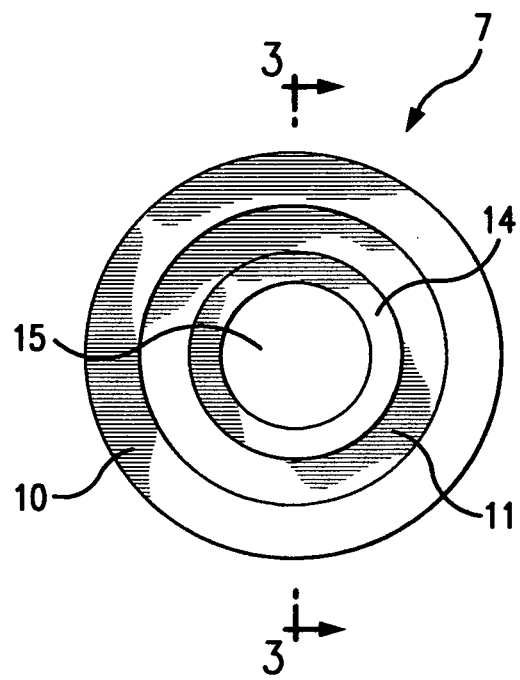
FIG. 2 is a full front view of a device of this invention.
Figure 3:
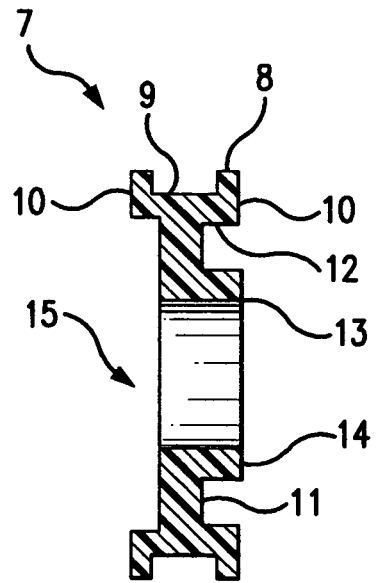
FIG. 3 is a full end view cross section of a device of this invention taken through line 3-3 of FIG. 2.

With regard to FIGS. 2, 3, and 4, there is shown the device 7 which is manufactured as a unitary component, meaning that it has the character of a unit and is not divided or discontinuous and is comprised of concentric circular portions.

The first portion is shown as an outer rim 8 that has an outside surface 9. The outside surface 9 has outside edges 10 that project perpendicularly from the outside surface 9. These outside edges 10 act as barriers for preventing slippage of a brace 3 used in the bearing assembly (not shown).

There is a second portion which is a center portion 11 that is essentially continuous with the outer rim 8 and this center portion 11 is located such that it is positioned essentially in the center of inside surface 12 of the outer rim 8. The center portion 11 has a lower front edge 13.

The third portion is a hub 14. The hub projects laterally from the lower front edge 12 of the center portion 11. The insulator 7 has a large centered opening 15 in it that fits over and accommodates the drive shaft 1.

Figure 5:
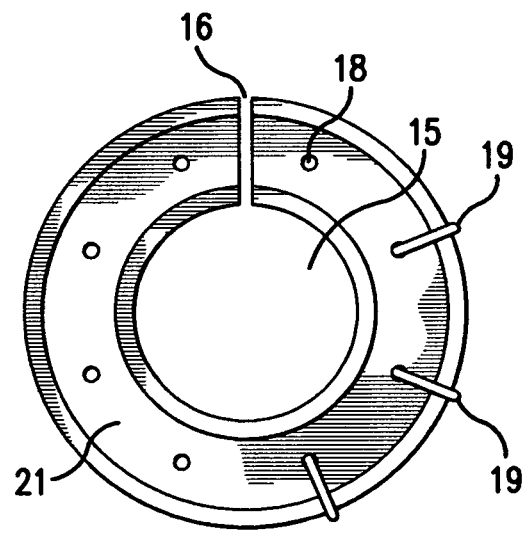
FIG. 5 is a full front view of a device of this invention showing a novel means of fastening in place.

The device 7 of this invention can be left essentially intact and fitted over the drive shaft 1. However, it is contemplated within the scope of this invention to provide for a split 16 (FIGS. 5 and 6) in the device 7 to enable one to separate the device 7, slip it around the drive shaft 1 and couple it in place. Conventionally, this is done by pinning the split 16 or gluing the split 16 once it is in place.

It is contemplated within the scope of this invention to place glue on the inside surface of the large centered opening 15 such that the device 7 is glued to the bearing on the drive shaft.

Figure 6:
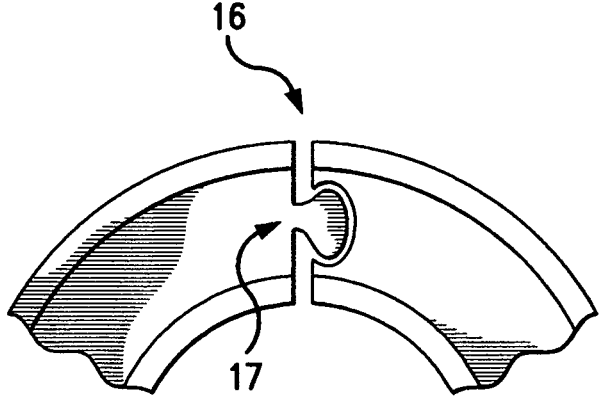
FIG. 6 is a portion of the top of a device of this invention showing a novel coupling means.

An alternative embodiment for fastening the device 7 in place is shown in FIG. 6 in which there is showing a snap closure 17. This snap closure can also be glued if desired.

It is further contemplated within the scope of this invention to place plastic bands 19 through openings 18 (FIG. 5), slip plastic band 19 through the openings and then fasten them down over the support brace 3 of the brace assembly.

It should be noted that this invention further contemplates placing openings 18 through the wall 21 of the center portion 11 to act as shock absorbers in addition to the capability of the elastomeric material.

What is claimed is:

1. An elastomeric compression preloaded support insulator for automotive drive shafts, said insulator comprising a unitary structure comprised of concentric circular portions including:
   (a) an outer rim having an outside surface, having outside edges that project perpendicular to the outside surface;
   (b) a center portion essentially centered in an inside surface of the outer rim, said center portion having a lower front edge;
   (c) a hub, said hub projecting laterally from the lower front edge of the center portion, there being a centered opening in the insulator, there being a series of openings through the outer rim.

2. The insulator as claimed in claim 1 further comprising a series of openings through the outer rim.

3. The insulator as claimed in claim 1 wherein the insulator has a snap closure and it is glued during installation.

4. The insulator as claimed in claim 1 wherein the insulator is split and is glued during installation.

5. The insulator as claimed in claim 1 wherein the insulator is split and is pinned together during installation.

6. The insulator as claimed in claim 1 wherein, in addition, there are ties located in the openings.

* * * * *